Patented Apr. 7, 1936

2,036,669

UNITED STATES PATENT OFFICE 2,036,669

ELECTROLYTE FOR ELECTROLYTIC CONDENSERS

Victor Yngve, Lakewood, Ohio, assignor, by mesne assignments, to Union Carbide and Carbon Corporation, a corporation of New York No Drawing. Application March 29, 1930, Serial No. 440,169. Renewed March 31, 1933

21 Claims. (Cl. 175—315)

This invention relates to electrolytic condensers which depend for their action upon the properties of the dielectric film which may be formed electrolytically upon the surface of aluminum or other so-called filming electrodes when the same are immersed in certain electrolytes and subjected to electric current. It has particular reference to a new and improved electrolyte for use on condensers of this nature.

Such an electrolyte should not only be a good conductor of electric current but should also act to maintain the film upon the aluminum or other anode with which it may be used. The more common electrolytes consist of solutions of the metallic salts or salts of ammonium. It is well known that when the ordinary electrolytic condenser is allowed to stand idle the dielectric film tends to deteriorate and permit a certain amount of current to pass. This leakage current tends to build up while the condenser is not in use, and when it is again connected in an electric circuit the film is restored at a varying rate depending on the previous history of the film, the nature of the electrolyte, and the temperature. It is therefore evident that one of the controlling factors in choosing a suitable electrolyte relates to the nature of its action on the dielectric film when the condenser stands idle.

In accordance with my invention an electrolyte is provided which has a very mild action on the dielectric film so that, at the end of an idle period, the film is not completely deteriorated but persists, at least in part. As a result, the film is rapidly reconstructed when the condenser is put into use, and the leakage quickly falls to its low final value.

My electrolyte consists essentially of a solution of one or more salts of the type in which an organic base is combined with an inorganic acid. Typical among a great variety of organic bases which may be suitable are the alkyl amine compounds, and aniline and its homologs. Salts of methylamine, ethylamine, dimethylamine, and diethylamine made by neutralizing the amine with a weak inorganic acid have been used. A typical salt of this nature is diethylamine borate.

The salts may be dissolved in an aqueous or non-aqueous solvent, or a mixture of both. As a non-aqueous solvent I have used and prefer an organic compound such as ethylene glycol or glycerine. Other organic solvents found to be suitable are methyl or ethyl alcohol, and acetone, either used alone or as a mixture of two or more.

The presence of an organic solvent in the electrolyte either alone or in predominating proportions with water will give a solution of non-freezing character at temperatures of ordinary usage. The organic solvent also decreases the corrosive action of the electrolyte on the active electrodes, and consequently lowers the current leakage of the finished condenser.

The concentration of the electrolyte solution may be varied over a wide range, but for all practical purposes a 5% to 20% solution is satisfactory. A typical solution may contain approximately 80 grams of diethylamine borate per liter of an ethylene glycol solvent. A concentration of approximately 190 grams of diethylamine borate per liter of a solvent mixture of ethylene glycol and water has also given good results.

Electrolytes of the nature herein described are suitable for use in any of the conventional forms of electrolytic condensers employing liquid electrolytes and with any of the usual film forming and other active electrodes.

I claim:

1. An electrolyte for an electrolytic condenser consisting of a solution comprising as the essential solute an alkyl amine salt of a weak inorganic acid.

2. An electrolyte for an electrolytic condenser consisting of a solution comprising essentially an alkyl amine salt of a weak inorganic acid in an organic solvent.

3. An electrolyte for an electrolytic condenser consisting of a solution of diethylamine borate.

4. An electrolyte for an electrolytic condenser consisting of a solution of diethylamine borate in an organic solvent.

5. An electrolyte for an electrolytic condenser consisting of a solution of diethylamine borate in a solvent of ethylene glycol.

6. An electrolyte for an electrolytic condenser consisting of a solution of diethylamine borate in a solvent of ethylene glycol and water.

7. An electrolyte for an electrolytic condenser consisting of a solution of diethylamine borate in a mixture of ethylene glycol and water, said solution containing 50 to 200 grams of diethylamine borate per liter of the solvent.

8. An electrolyte for an electrolytic condenser consisting of a solution of diethylamine borate in ethylene glycol, said solution having a concentration of approximately 80 grams of diethylamine borate per liter of the solvent.

9. An electrolyte for an electrolytic condenser consisting of a solution comprising essentially an alkyl amine salt of a weak inorganic acid in a solvent of an alkylene glycol of the 1,2 type.

10. An electrolyte for an electrolytic condenser consisting of a solution comprising essentially an alkyl amine salt of a weak inorganic acid in a solvent of ethylene glycol.

11. An electrolyte for an electrolytic condenser consisting of a solution comprising essentially an alkyl amine salt of boric acid in a solvent of ethylene glycol.

12. An electrolyte for an electrolytic condenser consisting of a solution of a member of the group: alkylamine compounds and aniline, in a solvent of the group consisting of monohydroxy alcohols and polyhydroxy alcohols.

13. An electrolyte for an electrolytic condenser consisting of a solution comprising a member of the group consisting of alkylamine compounds and aniline in a solvent of an alkylene glycol of the 1,2 type.

14. An electrolyte for an electrolytic condenser consisting of a solution in ethylene glycol of a member of the group consisting of alkylamine compounds and aniline.

15. An electrolyte for an electrolytic condenser consisting of a solution in glycerine of a member of the group consisting of alkylamine compounds and aniline.

16. An electrolyte for an electrolytic condenser consisting of a solution in ethyl alcohol of a member of the group consisting of alkylamine compounds and aniline.

17. An elecrolyte for an electrolytic condenser consisting of a solution of an electrolyte salt of an organic base in a solvent of the group consisting of monohydroxy alcohols and polyhydroxy alcohols.

18. An electrolyte for an electrolytic condenser consisting of a solution of an electrolyte salt of an organic base in a solvent of an alkylene glycol of the 1,2 type.

19. An electrolyte for an electrolytic condenser consisting of a solution of an electrolyte salt of an organic base in a solvent of ethylene glycol.

20. An electrolyte for an electrolytic condenser consisting of a solution of an electrolyte salt of an organic base in a solvent of glycerine.

21. An electrolyte for an electrolytic condenser consisting of a solution of an electrolyte salt of an organic base in a solvent of ethyl alcohol.

VICTOR YNGVE.